United States Patent [19]

Rombach et al.

[11] 4,005,976
[45] Feb. 1, 1977

[54] RODENT EXTERMINATOR

[76] Inventors: James L. Rombach, 2155 Nirvana St., Eugene, Oreg. 97401; David W. Strebel, 4380 Hall Road, Santa Rosa, Calif. 95401

[22] Filed: Aug. 14, 1975

[21] Appl. No.: 604,553

[52] U.S. Cl. .................................. 431/13; 43/124; 431/202; 431/264; 431/343; 431/344; 431/345

[51] Int. Cl.² ........................................ F23D 13/00

[58] Field of Search ............. 431/13, 202, 91, 264, 431/265, 266, 343, 344, 345, 353; 43/124, 125, 144

[56] References Cited

UNITED STATES PATENTS

| | | | |
|---|---|---|---|
| 1,295,349 | 2/1919 | Monroe | 431/343 |
| 1,309,193 | 7/1919 | Garrison | 43/125 UX |
| 2,095,710 | 10/1937 | Offutt et al. | 431/266 |
| 3,055,144 | 9/1962 | Johnson et al. | 431/343 X |

*Primary Examiner*—Robert G. Nilson
*Attorney, Agent, or Firm*—James D. Givnan, Jr.

[57] ABSTRACT

A gas fired apparatus discharging a mixed gas-air flow through a barrel into a confined area such as a rodent burrow. An igniter in said barrel ignites the gas-air mixture. A control assembly includes closely coupled gas and ignition controls enabling one hand operation. An extensible, ground engaging support positions the apparatus in an inclined manner for barrel penetration of a burrow opening. A valve in said barrel regulates gas-air mixing.

6 Claims, 5 Drawing Figures

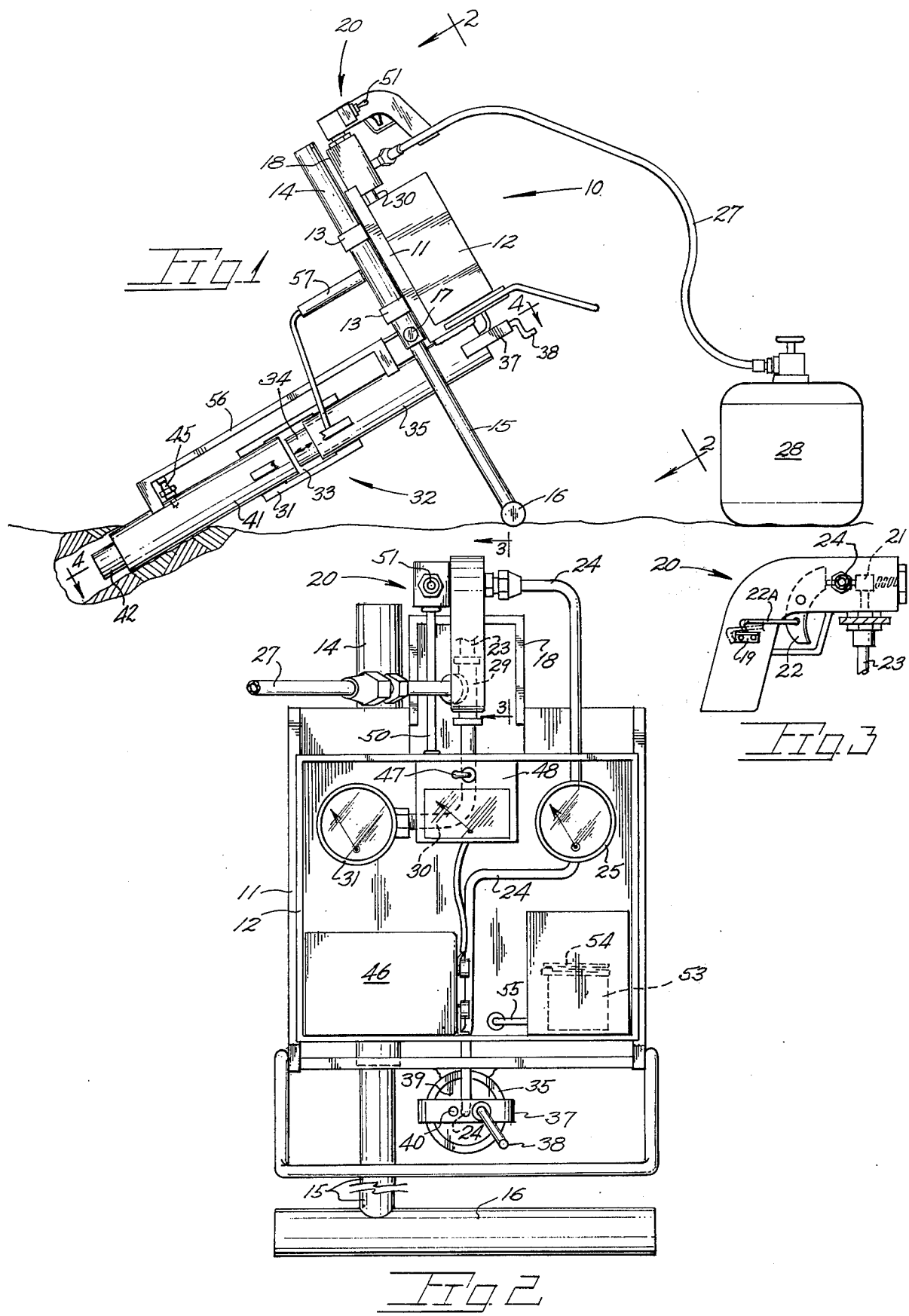

RODENT EXTERMINATOR

BACKGROUND OF THE INVENTION

The present field of invention concerns an apparatus for discharging inflammable gaseous vapor and thereafter igniting same for purposes of exterminating burrowing rodents. Other uses are later elaborated.

Known exterminating apparatuses typically rely on but one means for destroying the burrowing rodent, for example, in the prior art are devices for applying poisonous gas to the burrow while other exterminating apparatuses accomplish the deposit of poisonous granules into the burrow. As it is not uncommon for rodents to burrow a distance of 20 or 30 feet beneath the ground with several ground openings, the prior art systems for rodent extermination have proved to be something less than completely effective as they do not effectively reach the entire burrow.

Rodents are a serious threat to seedlings particularly in reforested areas. It is becoming increasingly important that certain types of rodents be controlled to avoid destruction to planted seedlings as the reforestation effort involves man-hour effort at substantial cost. Individual replacement of the seedling is necessary to achieve optimum log production of the reforested area. Further, burrowing rodents can impart damage to the terrain resulting in erosion which otherwise would not occur.

SUMMARY OF THE INVENTION

The present invention is embodied within a portable exterminating apparatus using an ignited charge of gas to produce both concussion and heat within the burrow along with residual toxic fumes, all contributing to rodent extermination. The heat, concussion and toxicity produced by the present apparatus have a cumulative effect which greatly increases its effectiveness.

The present apparatus includes a frame with an adjustable support enabling the apparatus to be inclined with respect to the ground surface. A barrel of the apparatus is accordingly positioned for insertion of its end into the burrow opening facilitating discharge of gas into the burrow and subsequent ignition of same. A nozzle within said barrel discharges the inflammable gas which mixes with ambient air at a desired ratio, the ratio being variable by means of an adjustable barrel member regulating an intake opening in the barrel. A gas valve and ignition switch are combined for convenient one-hand operation of the apparatus. A pair of pressure gauges on the apparatus permit the operator to monitor both the pressure of a remote supply tank as well as the pressure within a nozzle supply conduit. Also within said housing are ignition system components including a battery, volt meter, a master switch and an ignition component having a coil and vibrator inducing arcing across the electrodes of a spark plug located within the barrel.

Important objects of the present apparatus include: the provision of an exterminator discharging a quantity of gas into a burrow and thereafter igniting same to impart both concussion and heat to the burrow which along with the residual toxic fumes assure extermination of the rodent or rodents; an extermination apparatus having an adjustable barrel member to regulate the intake of ambient air for mixing with a gas, such as propane, for optimum ignition; the provision of an exterminator which may be positioned in an inclined free-standing manner with the barrel end of same inserted into the burrow opening; and the provision of an exterminating apparatus wherein both ignition and gas flow control means are incorporated conveniently for operation in a single handed manner.

BRIEF DESCRIPTION OF THE DRAWINGS

In the accompanying drawings:

FIG. 1 is a side elevational view of the apparatus disposed with its barrel end inserted within a burrow opening, FIG. 2 is a rear elevational view taken along line 2—2 of FIG. 1, FIG. 3 is a view of the operator control taken along line 3—3 of FIG. 2.

DETAILED DESCRIPTION OF PREFERRED EMBODIMENTS

Figure 4:
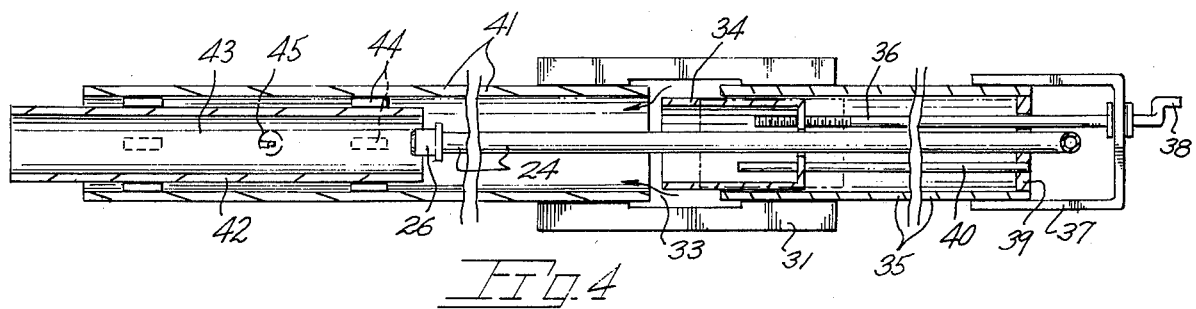
FIG. 4 is a sectional view taken along line 4—4 of FIG. 1 showing details of barrel construction.

With continuing attention to the accompanying drawings where applied reference numerals indicate parts similarly identified in the following description, the reference numeral 10 indicates generally the present apparatus including a frame 11 supporting a housing 12. Secured by means of straps 13 on frame 11 is a tubular standard 14 within which is slidably mounted a support 15 having a transversely extending foot 16 for stable rested engagement with the ground surface. A lock 17 is in threaded engagement with standard 14 enabling foot 16 to be locked in position to provide the desired inclination of the apparatus.

A mounting plate 18 is suitably secured to housing 12 and extends thereabove to mount a control assembly indicated generally at 20. Control assembly 20 includes a valve arrangement with a valve core 21 actuated by a trigger 22 to control a flow of gas from a conduit 23 to a discharge line 24. Discharge line 24 is routed past a tee connection (not shown) to gauge 25 and thence downwardly through the rearward end of a barrel structure later described terminating in a nozzle 26 (FIG. 4). A latch 22A engaged a bracket 19 to hold trigger 22 open.

With attention to FIGS. 1 and 2, a flexible line 27 feeds gaseous fuel from a conventional tank 28 into a tee fitting 29 whereat gas pressure is tapped via a line 30 to serve a second pressure gauge 31 indicating the pressure of gas within tank 28. Accordingly the fuel in a gaseous form is supplied by tank 28 to the intake side of valve 21 whereupon actuation of trigger 22 by the operator displaces the valve core forwardly to permit the gas to flow through line 24 for ultimate discharge into the later described barrel structure via nozzle 26.

A barrel structure is indicated generally at 32 and defines an air intake area 33 which permits the entry of ambient air into the tubular barrel structure. Connecting means 31 interconnects barrel segments. With particular attention to FIG. 4, a cylindrical valve member 34 is axially positionable within a barrel component 35 by means of a control rod 36 in threaded engagement at its inner end with said valve member. Control rod 36 is rotatably mounted to the rearward end of barrel component 35 by means of a bracket 37 within which is journalled one end of the control rods constituting a fingergrip 38. Rotation of said rod moves valve member 34 axially along with said barrel to open and close an air intake 33. For valve alignment purposes a guide rod 40 is provided secured at its rearward end to an end plate 39 secured in place and closing the barrel end. Located within a forward barrel component 41 is a tubular section 42 defining an ignition chamber 43 said section being spaced inwardly from the barrel by spacers 44 for the purpose of isolating said barrel from extreme temperatures. A spark plug 45 is seated within a threaded opening in barrel component 41 so as to locate its electrodes within chamber 43 forwardly offset from nozzle 26 for ignition of the combined flow of gas and ambient air.

Figure 5:
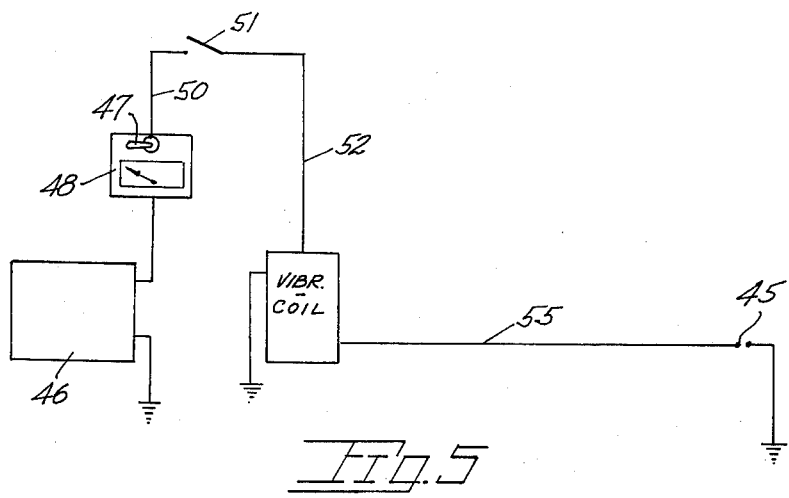
FIG. 5 is a diagrammatic view of the apparatus ignition system.

With attention jointly to FIGS. 2 and 5, an ignition system is provided including a battery 46, an on-off switch 47 incorporated into a volt meter 48 providing the status of battery 46. Upon closing of switch 47 a lead 50 provides a current flow to one side of an ignition switch 51 mounted on control assembly 20. Switch 51, spring-loaded to an open position, upon closure applies current via a lead 52 to a coil 53 and vibrator mechanism 54 which upon being energized provides a high voltage current to an electrode of spark plug 45 located within the barrel. A high tension lead 55 is suitably insulated from the frame of the apparatus and extends outwardly above barrel structure 32 and along a protective structure indicated at 56. Suitably secured to barrel structure 32 and frame 11 is a handle 57 provided at the apparatus center of gravity to provide convenient carrying of same.

In operation the apparatus is inclined so as to enable insertion of the barrel end within a burrow opening whereupon trigger 22 is actuated to provide a flow of gas such as propane into the burrow opening. During such time the pressure of the gas being discharged may be metered by means of gauge 25 enabling the operator to calculate the amount of fuel being discharged prior to ignition. Upon the burrow being suitably charged with the flammable gas switch 47 whereupon closure of switch 51 provides arcing across the electrodes of the spark plug with resultant ignition of the gas charge.

While the above description has been in conjunction with the use of the present apparatus for the extermination of burrowing rodents such is not intended to imply any limitation of use for the present apparatus as it may be used, for example, in other applications such as the ignition of slash piles of wood.

While we have shown but one embodiment of the invention it will be apparent to those skilled in the art that the invention may be embodied still otherwise without departing from the spirit and scope of the invention.

Having thus described the invention, what is desired to be secured under a Letters Patent is:

1. A portable apparatus for discharging and igniting a quantity of flammable gas within a closed area, said apparatus comprising,
    a frame including a support for ground engagement,
    a barrel including nozzle means for discharge of the flammable gas, said barrel including adjustable means regulating the intake of ambient air into the barrel for mixing with the gas,
    an igniter mounted within said barrel,
    a gas control valve mounted on said frame,
    a switch means mounted on said framework closing an electrical circuit to an ignition system serving said igniter means for ignition of the discharged gas.

2. The apparatus claimed in claim 1 wherein said frame support is extensible downwardly past one end segment of said barrel for supporting the apparatus in inclined relationship to the ground enabling insertion of the opposite end of said barrel into a rodent burrow.

3. The apparatus claimed in claim 2 wherein said frame support has a laterally projecting foot member whereby the apparatus may be free standing.

4. The apparatus claimed in claim 1 wherein said barrel adjustable means includes a manually actuated control rod and a cylindrically shaped valve positioned by said control rod.

5. The apparatus claimed in claim 1 wherein said gas control valve and said switch means are juxtaposed to enable joint operation thereof by one hand of the operator.

6. The apparatus claimed in claim 1 additionally including a pressure gauge on said frame indicating gas pressure in a nozzle supply conduit.

* * * * *